United States Patent
Hao et al.

(10) Patent No.: US 11,383,289 B2
(45) Date of Patent: Jul. 12, 2022

(54) HIGH-SPEED STAMPING TRANSFER ROBOT

(71) Applicant: JINAN HAOZHONG AUTOMATION CO., LTD., Jinan (CN)

(72) Inventors: Yuxin Hao, Jinan (CN); Jun Li, Jinan (CN); Xipeng Zhao, Jinan (CN); Qingshan Zhan, Jinan (CN)

(73) Assignee: JINAN HAOZHONG AUTOMATION CO., LTD., Jinan (CN)

( * ) Notice: Subject to any disclaimer, the term of this patent is extended or adjusted under 35 U.S.C. 154(b) by 892 days.

(21) Appl. No.: 16/198,944

(22) Filed: Nov. 23, 2018

(65) Prior Publication Data
US 2020/0078851 A1    Mar. 12, 2020

(30) Foreign Application Priority Data
Sep. 7, 2018    (CN) .......................... 201811040906.0

(51) Int. Cl.
| | | |
|---|---|---|
| *B25J 9/00* | (2006.01) | |
| *B21D 43/05* | (2006.01) | |
| *B25J 11/00* | (2006.01) | |
| *B25J 9/02* | (2006.01) | |
| *B25J 9/10* | (2006.01) | |
| *B21D 43/10* | (2006.01) | |

(52) U.S. Cl.
CPC .......... *B21D 43/055* (2013.01); *B25J 9/0009* (2013.01); *B25J 9/023* (2013.01); *B25J 9/104* (2013.01); *B25J 11/005* (2013.01); *B21D 43/105* (2013.01)

(58) Field of Classification Search
CPC .......... B25J 9/0009; B25J 9/023; B25J 9/104; B21D 43/105; B21D 43/055
USPC ........................ 211/124, 18, 87.01, 182, 183
See application file for complete search history.

(56) References Cited

FOREIGN PATENT DOCUMENTS

| | | | | | |
|---|---|---|---|---|---|
| JP | 04022143 | U | * | 1/1989 | |
| JP | 64009938 | U | * | 1/1989 | |
| JP | 01123747 | A | * | 5/1989 | |
| JP | 06150827 | A | * | 5/1994 | |
| JP | 2003039372 | A | * | 2/2003 | |
| JP | 2005081447 | A | * | 3/2005 | |
| JP | 2006142457 | A | * | 6/2006 | .............. B25J 18/04 |
| JP | 2011031268 | A | * | 2/2011 | |
| JP | 2012011418 | A | * | 1/2012 | |
| JP | 2013022642 | A | * | 2/2013 | |

(Continued)

*Primary Examiner* — Gerald McClain
(74) *Attorney, Agent, or Firm* — Maier & Maier, PLLC

(57) ABSTRACT

A high-speed stamping transfer robot, including a Y-axis portion, a Z1-axis portion, a Z2-axis portion (upper arm), a mechanical lower arm portion and a tooling portion, wherein the Z1-axis portion is fixedly connected to the Y-axis portion; the Z2-axis portion (upper arm) is in rotational connection with the Z1-axis portion and the Y-axis portion and is capable of moving vertically relative to the Z1-axis portion while moving horizontally relative to the Y-axis portion; the mechanical lower arm portion is in rotational connection with the Z2-axis portion (upper arm) and is capable of rotating relative to the Z2-axis portion (upper arm); and the tooling portion is fixedly connected to the mechanical lower arm portion. Through linkage among the respective axis portions, high-speed and high-load stable transfer of sheets between presses can be realized.

9 Claims, 9 Drawing Sheets

(56) References Cited

FOREIGN PATENT DOCUMENTS

| JP | 2016505396 A | * | 2/2016 |
| JP | 2016528047 A | * | 8/2017 |

* cited by examiner

HIGH-SPEED STAMPING TRANSFER ROBOT

FIELD

The present invention relates to the field of high-speed stamping automation, and in particular to a high-speed stamping transfer robot.

BACKGROUND

In the stamping industry of automobile panels, the production of a workpiece often needs continuous stamping by multiple presses. Thus, transfer of sheets between the presses is crucial and directly affects the quality of stamped products and the efficiency of an entire stamping production line.

On a traditional manual production line, the sheets are manually transferred between the presses. At least two workers are required to transfer semi-finished products between the presses. Since the sheets may be warped, collided and inaccurately located by manual transfer, which severely impacts the quality of the stamped products and the product stamping efficiency, currently, more and more automobile manufacturers replace the traditional manual production line with an automatic robot stamping line that can realize automatic transfer of the sheets between the presses, thus replacing the workers with a robot and guaranteeing the product quality and stability. At present, a common automatic robot line employs such special robots for stamping as those manufactured by ABB, KUKA, FANUC and YASKAWA, with a maximum load of 100 kg and a maximum arm spread of 3,000 mm. The automatic production line can achieve the pace of 8 times/minute, and therefore, can meet basic requirements for production. With rapid and efficient development of the automobile industry, the annual output of automobiles continues to increase. The transfer of the sheets between the presses restricts the overall production cycle of the automatic stamping line. Nowadays, the production efficiency of the common automatic robot line cannot meet the needs for efficient production.

SUMMARY

An objective of the present invention is to overcome the shortcomings in the prior art and to provide a high-speed stamping transfer robot.

A technical solution adopted to solve the technical problem is as below.

The high-speed stamping transfer robot comprises a Y-axis portion, a Z1-axis portion, a Z2-axis portion, a mechanical lower arm portion and a tooling portion. The Z1-axis portion is fixedly connected to the Y-axis portion. The Z2-axis portion is in rotational connection with the Z1-axis portion and the Y-axis portion and is capable of moving vertically relative to the Z1-axis portion while moving horizontally relative to the Y-axis portion. The mechanical lower arm portion is in rotational connection with the Z2-axis portion and is capable of rotating relative to the Z2-axis portion. The tooling portion is fixedly connected to the mechanical lower arm portion.

Preferably, the Y-axis portion comprises a first transmission shaft. Synchronous pulleys are disposed on the first transmission shafts and are mounted on two sides of the interior of a Y-axis base. A first synchronous belt is mounted on the synchronous pulley. A first sliding seat is disposed on the first synchronous belt and connected to a first rotary seat through a bearing. First linear guide rails that are symmetrical are disposed on two sides of the first synchronous belt. A first slider that corresponds to the first linear guide rail is disposed on the first sliding seat. The first sliding seat is capable of moving horizontally along the first linear guide rail which is equipped with a guide rail brake. A first limiting block is disposed on the outer side of the first transmission shaft.

Further, two synchronous pulleys are disposed on the first transmission shaft. The first synchronous belt is mounted on each of the two synchronous pulleys that are symmetrical. Bearing supports are mounted at the two ends and in the middle of the first transmission shaft.

Preferably, the Z1-axis portion comprises a Z1-axis base. The bottom of the Z1-axis base is fixedly mounted on the Y-axis base. A second transmission shaft with a first driving pulley disposed thereon is mounted at the top of the interior of the Z1-axis base. A first driven pulley is disposed at the bottom of the interior of the Z1-axis base. A second synchronous belt is mounted on the first driving pulley and the first driven pulley. A second sliding seat is disposed on the second synchronous belt and connected to a second rotary seat through a bearing. Second linear guide rails are disposed on two sides of the second synchronous belt. A second slider that corresponds to the second linear guide rail is disposed on the second sliding seat. The second sliding seat is capable of moving vertically along the second linear guide rail which is equipped with a guide rail brake.

Further, the Z1-axis portion comprises a speed-up pulley block and a balance cylinder. The speed-up pulley block is mounted on a base of the speed-up pulley block, which is located at the upper end of the Z1-axis base. A steel wire rope is connected to the second sliding seat and wound in a fixed pulley groove of the speed-up pulley block, and enlaces a movable pulley on the balance cylinder. The other end of the steel wire rope is connected to the base of the speed-up pulley block.

Preferably, the Z2-axis portion comprises a Z2-axis base. A third transmission shaft with a second driving pulley disposed thereon is mounted at the top of the interior of the Z2-axis base. A second driven pulley is disposed at the bottom of the interior of the Z2-axis base. A third synchronous belt with a third sliding seat disposed thereon is mounted on the second driving pulley and the second driven pulley. Third linear guide rails are disposed on the front side and the back side of the Z2-axis base and located on two sides of the third synchronous belt. The third sliding seat is mounted on and is capable of moving linearly along the third linear guide rail on the front side of the Z2-axis base. The third linear guide rail on the back side of the Z2-axis base is connected to the Y-axis portion in a sliding manner. The back side of the Z2-axis base is connected to the second rotary seat.

Preferably, the mechanical lower arm portion comprises a D1-axis portion, an E-axis portion and a D2-axis portion.

The D1-axis portion is in rotational connection with the Z2-axis portion.

The E-axis portion comprises a driving mechanism, an inner sleeve and an outer sleeve. The outer sleeve and the inner sleeve are connected through a bearing. An output end of the driving mechanism is fixedly connected to one end of the inner sleeve. The D1-axis portion is fixedly connected to the outer sleeve.

The D2-axis portion comprises a D2-axis fixed seat fixedly connected to the other end of the inner sleeve. A fourth transmission shaft with a third driving pulley disposed thereon is mounted in the D2-axis fixed seat. A third driven pulley is disposed in the D2-axis fixed seat. A fourth synchronous belt is mounted on the third driving pulley and the third driven pulley. Connecting flange plates connected to the tooling portion are disposed at two ends of the third driven pulley.

Further, a tensioning device is further disposed in the D2-axis fixed seat and comprises a swing rod, a tensioning wheel and an ejector rod. One end of the swing rod is hinged to the inner wall of the D2-axis fixed seat. The tensioning wheel is disposed at the other end of the swing rod. One end of the ejector rod is fixedly connected to the inner wall of the D2-axis fixed seat. The other end of the ejector rod is propped in a concave hole in the middle of the swing rod. The ejector rod is in threaded connection with an adjusting nut. The tensioning wheel is clung to the fourth synchronous belt.

Preferably, the tooling portion comprises two toolings each of which comprises a main rod and an auxiliary rod. A plurality of connecting pieces sleeves the main rod and is connected to the two auxiliary rods that are symmetrical. The auxiliary rod is perpendicular to the main rod. A sucker is disposed at the other end of the auxiliary rod. A connecting flange connected to the mechanical lower arm portion is disposed at one end of the main rod.

Preferably, the transfer robot further comprises a suspension portion. The suspension portion comprises a connecting base, a first connecting rod, a second connecting rod, a third connecting rod, a fourth connecting rod, a fifth connecting rod, a sixth connecting rod, a first lug, a second lug, a third lug and a fourth lug. One end of the first connecting rod and one end of the second connecting rod are hinged to one end portion at the bottom of the connecting base, and the other end of the first connecting rod and the other end of the second connecting rod are hinged to the first lug and the third lug respectively. One end of the fifth connecting rod and one end of the sixth connecting rod are hinged to the other end portion at the bottom of the connecting base, and the other end of the fifth connecting rod and the other end of the sixth connecting rod are hinged to the second lug and the fourth lug respectively. One end of the third connecting rod and one end of the fourth connecting rod are hinged to the top of the connecting base, and the other end of the third connecting rod and the other end of the fourth connecting rod are hinged to the first lug and the second lug respectively. The connecting base is fixedly connected to the Y-axis portion.

The present invention has the following beneficial effects.

(1) The overall structure adopts linkage motion of the upper arm and the lower arm. The motion space in a logistics direction is small. The presses are compact in layout. The sheet transmission distance is short. The factory area is saved. The tail end of the lower arm stably swings back and forth at a high-speed. The characteristics of high speed and efficiency, stable running, compact layout and the like of a high-speed robot are highlighted. Imperious demands for high grade, high efficiency and high pace of the automatic stamping industry are met.

(2) The suspension portion adopts a fixation mode of a six-connecting-rod hinged structure, such that vibration caused when the presses and the robot move separately may be relieved, avoiding resonance and facilitating high-speed stable running of the high-speed stamping transfer robot. By adjusting the lengths of the connecting rods, not only may mounting requirements of the presses of different models and sizes be satisfied, but also the form and location tolerance of the high-speed robot is conveniently adjusted.

(3) Main parts of the upper arm and the lower arm are made of aluminium alloy, so that the weight of the moving part is reduced, and the movement inertia is reduced. Correspondingly, the overall driving energy consumption is reduced. The running cost is lowered.

(4) Since all the parts have simple motion loci, locus curves may be analyzed and optimized conveniently through kinematics. The loci of different dies may be optimized and processed quickly. The applicability is strong. Debugging after installation is facilitated.

(5) The E-axis portion has a rotation function, delicate design and high structural strength, and not only is suitable for conveying heavy-load materials but also may realize transfer of materials between the presses in a direction inclined to the logistics direction.

(6) Due to rotational motion of the D2-axis portion, the transferred sheet is always kept horizontal in a transfer process, so that air resistance is reduced, and the sheet is prevented from interference with ambient objects. The transmission design of the D2-axis portion adopts the synchronous belt for transmission, such that on the premise of guaranteeing accurate transmission, contact impact between the sucker and the sheet may be resisted during material taking by the tooling at the tail end, avoiding a damage caused by direct resistance by the speed reducer.

BRIEF DESCRIPTION OF THE DRAWINGS

The accompanying drawings, which constitute a part of the present invention, serve to provide a further understanding of the present invention. In the accompanying drawing.

Figure 1:
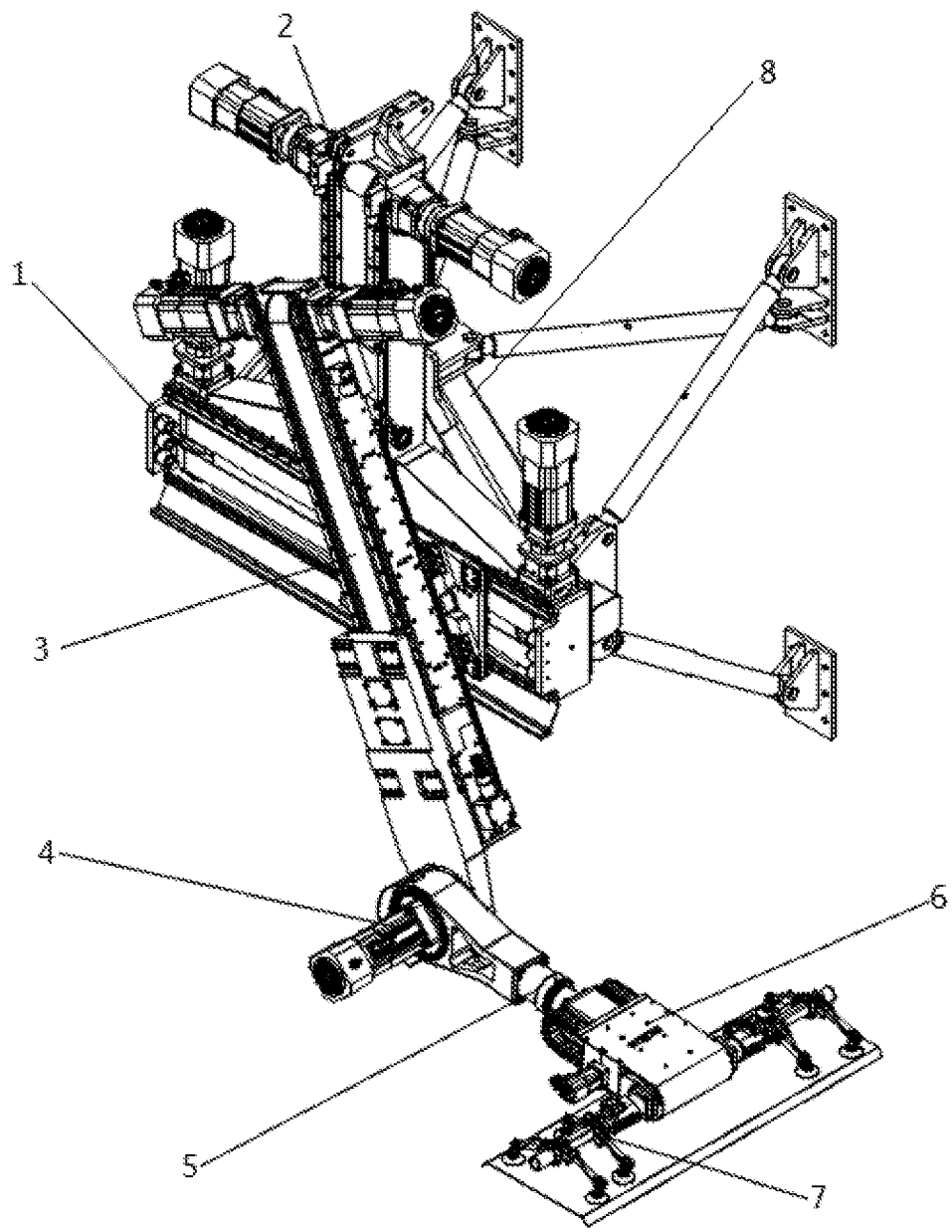
FIG. 1 is a structural schematic view of a high-speed stamping transfer robot provided by the present invention.

In the drawings, the respective numbers represent the following respective elements: 1, Y-axis portion; 101, Y-axis base; 102, first servo motor; 103, first speed reducer; 104, first speed reducer mounting base; 105, first transmission shaft; 106, synchronous pulley; 107, first synchronous belt; 108, first sliding seat; 109, first rotary seat; 110, first linear guide rail; 111, first limiting block; 2, Z1-axis portion; 201, Z1-axis base; 202, second servo motor; 203, second speed reducer; 204, second speed reducer mounting base; 205, first driving pulley; 206, first driven pulley; 207, second synchronous belt; 208, second sliding seat; 209, second rotary seat; 210, second linear guide rail; 211, speed-up pulley block; 212, balance cylinder; 3, Z2-axis portion; 301, Z2-axis base; 302, third servo motor; 303, third speed reducer; 304, third speed reducer mounting base; 305, second driving pulley; 306, third synchronous belt; 307, third sliding seat; 308, third linear guide rail; 309, bumper; 310, second limiting block; 4, D1-axis portion; 401, fourth servo motor; 402, fourth speed reducer mounting base; 403, fourth speed reducer; 5, E-axis portion; 501, fifth servo motor; 502, fifth speed reducer; 503, outer sleeve; 504, inner sleeve; 505, bearing; 6, D2-axis portion; 601, D2-axis fixed seat; 602, sixth servo motor; 603, sixth speed reducer; 604, third driving pulley; 605, third driven pulley; 606, fourth synchronous belt; 607, swing rod; 608, tensioning wheel; 609, ejector rod; 610, connecting flange plate; 7, tooling portion; 701, main rod; 702, connecting piece; 703, auxiliary rod; 704, sucker; 705, connecting flange; 8, suspension portion; 801, connecting base; 802, first connecting rod; 803, second connecting rod; 804, third connecting rod; 805, fourth connecting rod; 806, fifth connecting rod; 807, sixth connecting rod, 808, first lug; 809. second lug; 810, third lug; 811, fourth lug; 812, connecting sleeve; 9, press; 10, stamping die; 11, high-speed stamping transfer robot.

DETAILED DESCRIPTION

The technical solutions in the embodiments of the present invention will be clearly and completely described in the following with reference to the accompanying drawings in the embodiments of the present invention. It is obvious that the described embodiments are only part of but not all of the embodiments of the present invention. All other embodiments obtained by those skilled in the art based on the embodiments of the present invention without creative work shall fall within the scope of protection of the present invention.

As shown in FIGS. 1-7, a high-speed stamping transfer robot comprises a Y-axis portion (1), a Z1-axis portion (2), a Z2-axis portion (3), a mechanical lower arm portion and a tooling portion (7). The Z1-axis portion (2) is fixedly connected to the Y-axis portion (1). The Z2-axis portion (3) is in rotational connection with the Z1-axis portion (2) and the Y-axis portion (1) and is capable of moving vertically relative to the Z1-axis portion (2) while moving horizontally relative to the Y-axis portion (1). The mechanical lower arm portion is in rotational connection with the Z2-axis portion (3) and is capable of rotating relative to the Z2-axis portion (3). The tooling portion (7) is fixedly connected to the mechanical lower arm portion.

Figure 2:
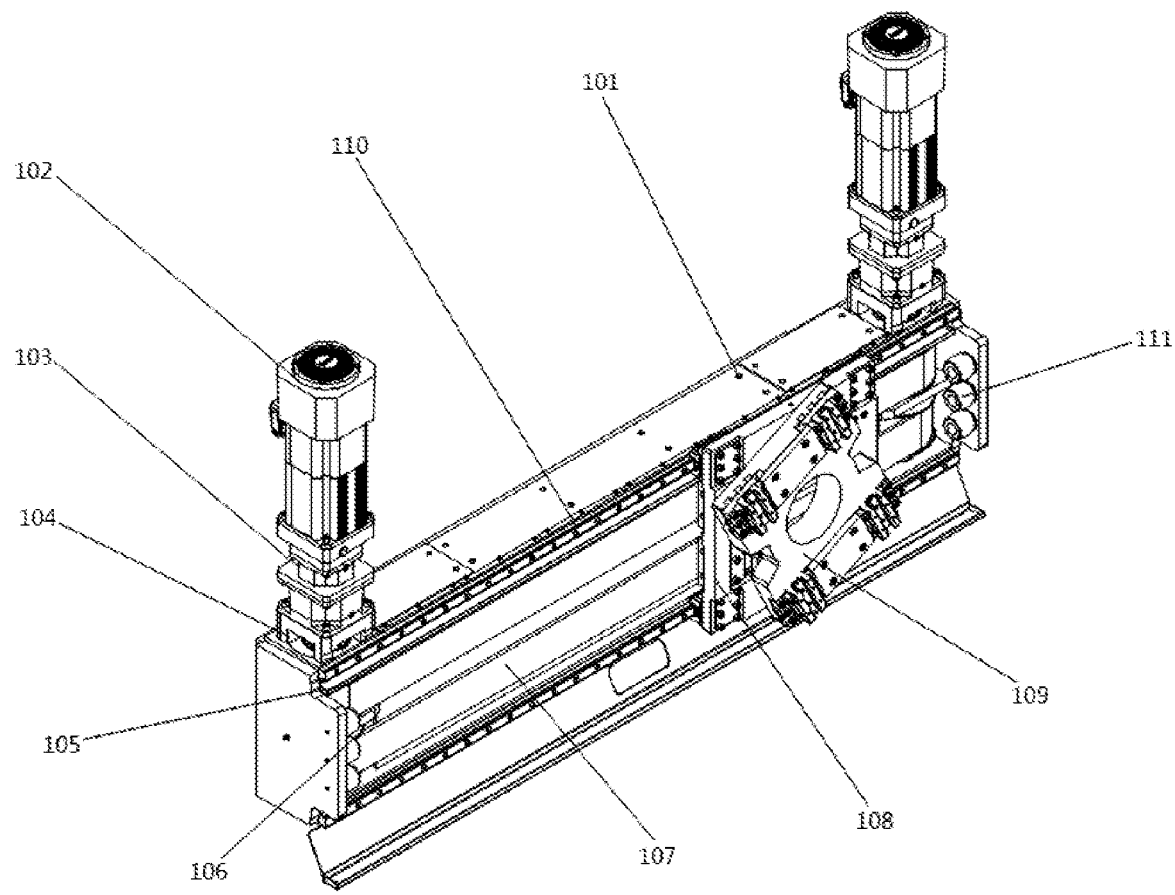
FIG. 2 is a structural schematic view of a Y-axis portion provided by the present invention.

As shown in FIG. 2, the Y-axis portion (1) comprises a first servo motor (102), a first speed reducer (103), a first speed reducer mounting base (104), a Y-axis base (101) and a first transmission shaft (105). The first speed reducer mounting bases (104) are mounted on two sides of the Y-axis base (101). The first speed reducer (103) is mounted on the first speed reducer mounting base (104). The first servo motor (102) is directly connected to the first speed reducer (103). An output shaft of the first speed reducer (103) is connected to the first transmission shaft (105) by means of a locking disk, such that a big torque may be transferred, and mounting and dismounting are facilitated. A synchronous pulley (106) with a first synchronous belt (107) mounted thereon is disposed on the first transmission shaft (105). A first sliding seat (108) is disposed on the first synchronous belt (107) and connected to a first rotary seat (109) through a bearing to form a passive rotation pair. First linear guide rails (110) that are symmetrical are disposed on two sides of the first synchronous belt (107) and are perpendicular to an axis direction of the first servo motor (102). A first slider that corresponds to the first linear guide rail (110) is disposed on the first sliding seat (108). The first sliding seat (108) is capable of moving horizontally along the first linear guide rail (110) which is equipped with a guide rail brake. The passive rotation pair may conduct not only a linear motion but also a rotary motion. A first limiting block (111) is disposed on the outer side of the first transmission shaft (105).

Preferably, two synchronous pulleys (106) may be disposed on the first transmission shaft (105). The first synchronous belt (107) is mounted on each of the two synchronous pulleys (106) that are symmetrical. Bearing supports are mounted at the two ends and in the middle of the first transmission shaft (105) and configured to bear transmission power of an entire moving part of the robot in a sheet conveying direction. The bearing support in the middle of the first transmission shaft (105) is driven by two synchronous belts to achieve uniform power transmission and to meet the demand for a greater conveying force.

A power source adopts two motors with relatively lower power for driving and may also adopt one high-power motor for driving. Here, the two first servo motors (102) with relatively lower power are adopted for driving. The first synchronous belt (107) for driving and tensioning is mounted on the inner side of the first sliding seat (108). The tightness of the first synchronous belt (107) is adjusted by adjusting a long screw to reduce a reciprocating clearance error. A belt breakage detection switch of the first synchronous belt (107) of the Y-axis portion is mounted on the first sliding seat 108. The first limiting block (111) is arranged on the outer side of the first transmission shaft (105). The guide rail brake is mounted on the first linear guide rail (110). When the belt breakage detection switch detects that the first synchronous belt (107) is broken, the guide rail brake immediately locks the first linear guide rail (110) to prevent the first sliding seat (108) from movement, avoiding an equipment damage after the belt breakage.

Figure 3:
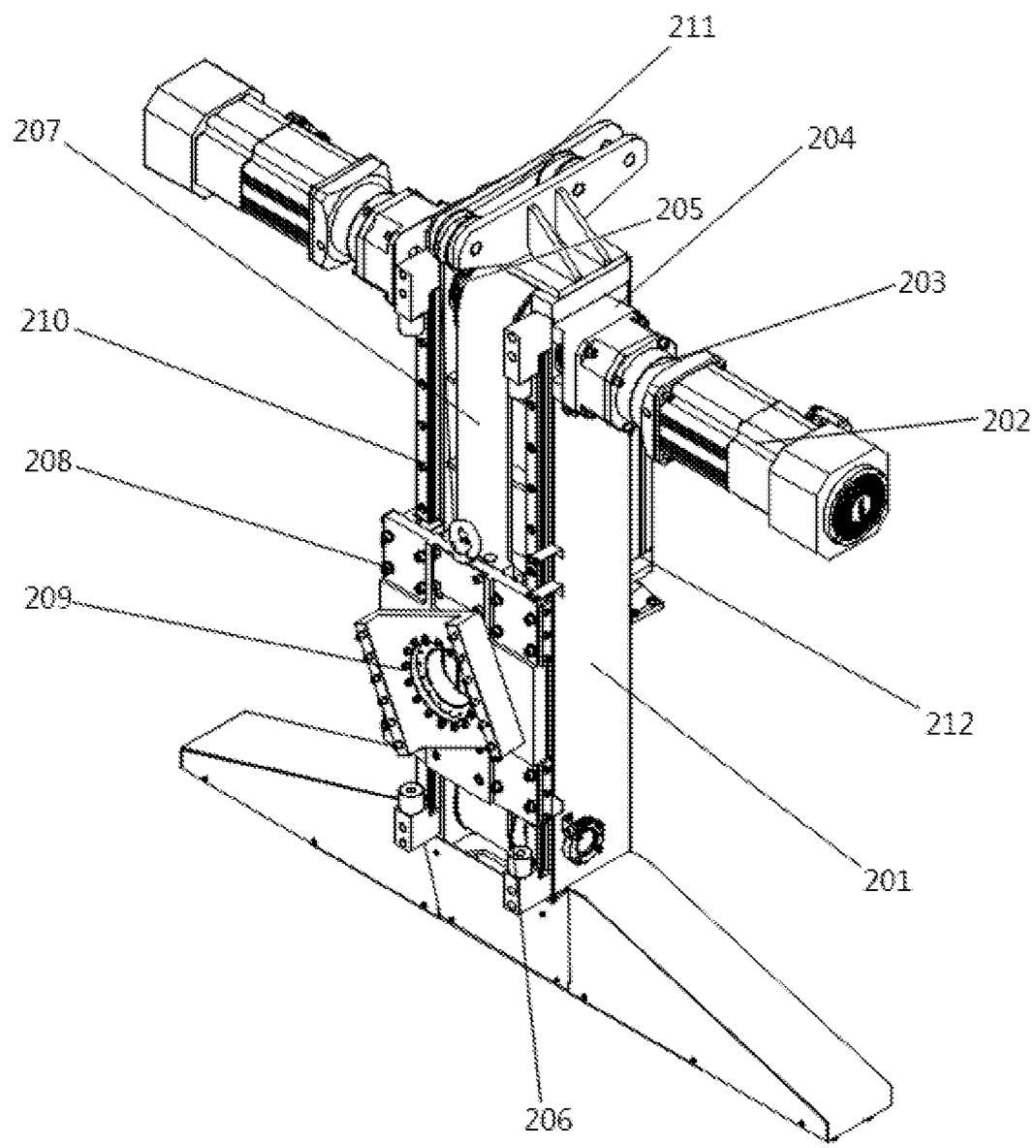
FIG. 3 is a structural schematic view of a Z1-axis portion provided by the present invention.

As shown in FIG. 3, the Z1-axis portion (2) comprises a Z1-axis base (201). The bottom of the Z1-axis base (201) is fixedly mounted in the middle of the first servo motor (102) on the Y-axis base (101). The Z1-axis base (201) is secured to the Y-axis portion (1) through a processed locating straight port to guarantee the mounting accuracy. Second speed reducer mounting bases (204) are disposed on two sides of the top of the Z1-axis base (201). A second speed reducer (203) is mounted on the second speed reducer mounting base (204) and directly connected to a second servo motor (202). An output shaft of the second speed reducer (203) is connected to a second transmission shaft by means of a locking disk, such that a big torque may be transferred, and mounting and dismounting are facilitated. A first driving pulley (205) is disposed on the second transmission shaft. A first driven pulley (206) is disposed at the bottom of the Z1-axis base (201). The first driving pulley (205) and the first driven pulley (206) are mounted in the Z1-axis base (201). A second synchronous belt (207) is mounted on the first driving pulley (205) and the second driving pulley (206). A second sliding seat (208) is disposed on the second synchronous belt (207) and connected to a second rotary seat (209) through a bearing to form a passive rotation pair. Second linear guide rails (210) are disposed on two sides of the second synchronous belt (207) and are perpendicular to an axis direction of the second servo motor (202). A second slider that corresponds to the second linear guide rail (210) is disposed on the second sliding seat (208). The second sliding seat (208) is capable of moving back and forth vertically along the second linear guide rail (210). In this way, the passive rotation pair may conduct not only a linear motion but also a rotary motion. The second linear guide rail (210) is equipped with a guide rail brake. The Z1-axis portion (2) further comprises a speed-up pulley block (211) and a balance cylinder (212). The speed-up pulley block (211) is mounted on a base of the speed-up pulley block (211), which is located at the upper end of the Z1-axis base (201). A steel wire rope is connected to the second sliding seat (208) and wound in a fixed pulley groove of the speed-up pulley block (211), and enlaces a movable pulley on the balance cylinder (212). The other end of the steel wire rope is connected to the base of the speed-up pulley block (211).

The power source adopts two motors with relatively lower power for driving and may also adopt one high-power motor for driving. Here, the two second servo motors 202 with relatively lower power are adopted for driving. Tensioning of the second synchronous belt 207 is realized by adjusting a long screw on the inner side of the second sliding seat (208), such that the second synchronous belt (207) is moderately tightened. Thus, the stability of a driving system is guaranteed.

Since the second linear guide rail (210) is equipped with the guide rail brake, when the second synchronous belt (207) is broken or the steel wire rope at the balance cylinder (212) is suddenly broken, the guide rail brake immediately locks the second linear guide rail to prevent the second sliding seat (208) from movement, avoiding an equipment damage after the belt breakage. The balance cylinder (212) balances the overall weight of the moving part of the high-speed stamping transfer robot (11) through the speed-up pulley block (211). Thus, the driving power of the Z1-axis portion (2) and the working energy consumption are reduced. The balance cylinder 212 is secured to a suspension portion (8). One end of the steel wire rope is secured to the second sliding seat (208), and the other end thereof is secured to the base of the speed-up pulley block (211). The speed-up pulley block (211) is sped up to ensure that the vertical movement speed of the second sliding seat (208) of the Z1-axis portion (2) is two times of the movement speed of the balance cylinder (212). Thus, the speed of the cylinder is halved. The movement distance of the cylinder is half of the movement distance of the second sliding seat (208) of the Z1-axis portion (2). In this way, both the mounting space and the movement speed of the cylinder are reduced.

Figure 4:
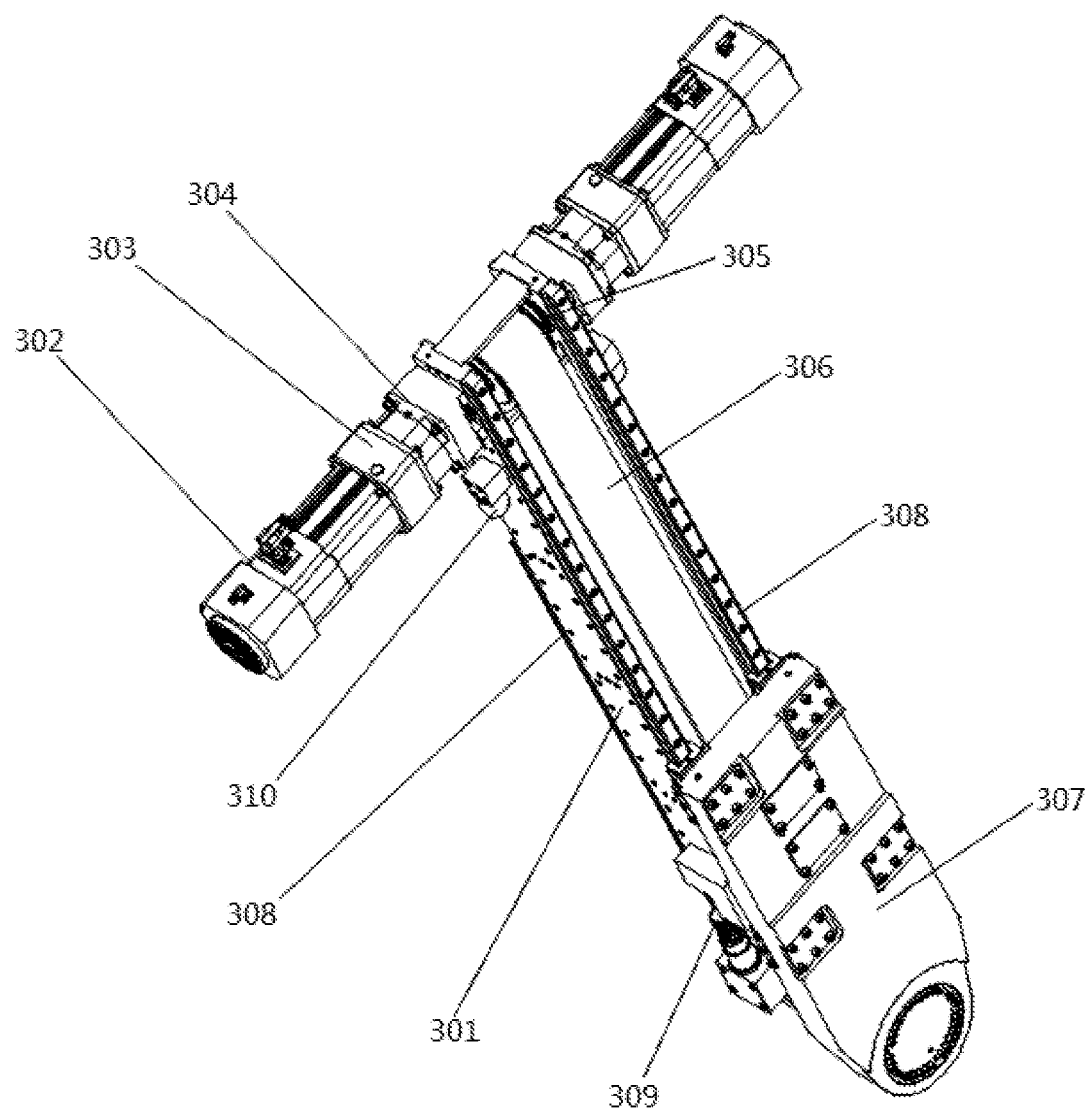
FIG. 4 is a structural schematic view of a Z2-axis portion (upper arm) provided by the present invention.

As shown in FIG. 4, for the high-speed stamping transfer robot (11), a Z2-axis portion (3) is equivalent to an upper arm of the robot and comprises a Z2-axis base (301). To reduce the weight of the moving part, the Z2-axis base (301) is formed by connecting aluminium plates, such that power required by the Z1-axis portion (2) and the Y-axis portion (1) is reduced. Third speed reducer mounting bases (304) are disposed on two sides of the top of the Z2-axis base (301). A third speed reducer (303) is mounted on the third speed reducer mounting base (304) and directly connected to a third servo motor (302). An output shaft of the third speed reducer (303) is connected to the third transmission shaft by means of a locking disk, such that a big torque may be transferred, and mounting and dismounting are facilitated. A second driving pulley (305) is disposed on the third transmission shaft. A second driven pulley is disposed at the bottom of the Z2-axis base (301). The second driving pulley (305) and the second driven pulley are mounted in the Z2-axis base (301). A third synchronous belt (306) with a third sliding seat (307) disposed thereon is mounted on the second driving pulley (305) and the second driven pulley. Third linear guide rails (308) are disposed on the front side and the back side of the Z2-axis base (301) and located on two sides of the third synchronous belt (306). A third slider that corresponds to the third linear guide rail (308) is disposed on the third sliding seat (307). The third sliding seat (307) is mounted on and is capable of moving linearly along the third linear guide rail (308) on the front side of the Z2-axis base (301). Bumpers (309) are disposed on two sides of the bottom of the Z2-axis base (301). Second limiting blocks (310) are disposed on two sides of the top of the Z2-axis base (301) and configured for safety protection of movement of the third sliding seat (307). A fourth slider that corresponds to the third linear guide rail (308) is disposed on the first rotary seat (109) of the Y-axis portion (1). The Z2-axis portion (3) and the Y-axis portion (1) are connected in a sliding manner through the third linear guide rail (308) on the back side of the Z2-axis base (301) and the fourth slider. In this way, the Z2-axis base (301) may not only move linearly along the first sliding seat (108) of the Y-axis portion (1) but also rotate around the first sliding seat (108) of the Y-axis portion (1). As the back side of the Z2-axis base (301) is connected to the second rotary seat (209), the Z2-axis portion (3) may not only move linearly and vertically along the second linear guide rail (210) of the Z1-axis portion (2) but also rotate around the second rotary seat (209) of the Z1-axis portion (2). Thus, the Z2-axis portion (3) may move within a plane formed by the Y-axis portion (1) and the Z1-axis portion (2).

Here, two motors are adopted for driving and symmetrically distributed and mounted. The center of gravity is kept on a symmetric plane. Thus, stable driving and running during swinging of the Z2-axis portion (3) may not be impacted by a stress imbalance during reciprocating swinging of the Z2-axis portion (3). The second limiting block (310) and the bumper (309) are mounted on the Z2-axis base (301), such that the third sliding seat (307) may not be disengaged from the third linear guide rail (308) during mounting or abnormal running. Thus, the second limiting block (310) and the bumper (309) are configured for safety protection of movement of the third sliding seat (307), avoiding personal casualties and equipment damages.

Figure 5:
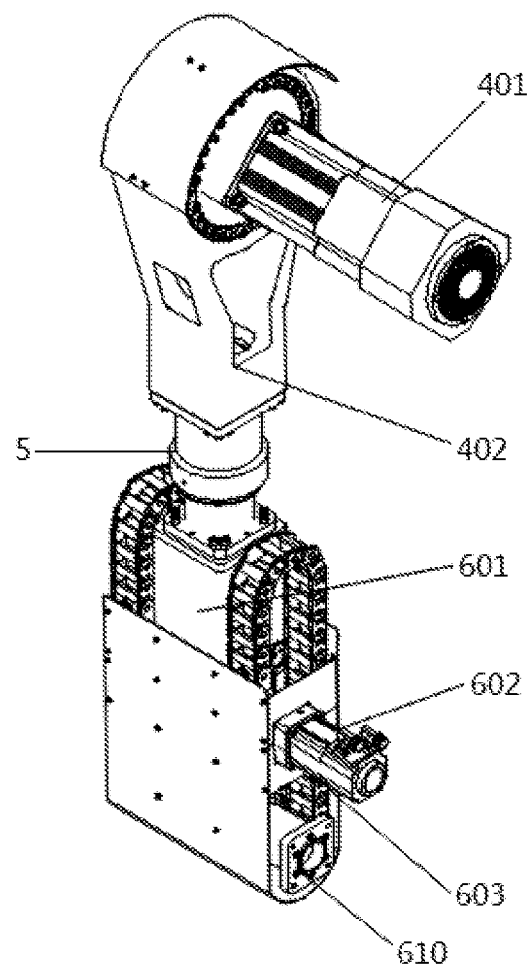
FIG. 5 is a structural schematic view of a mechanical lower arm portion provided by the present invention.
Figure 6:
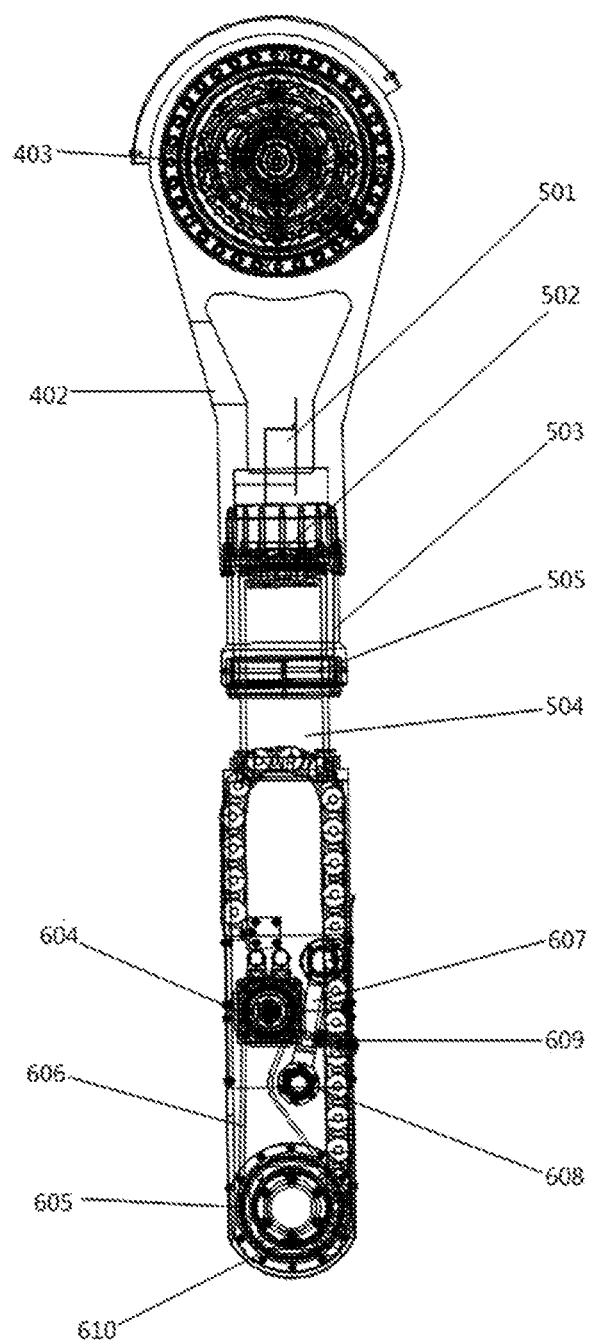
FIG. 6 is a side view of a mechanical lower arm portion provided by the present invention.

As shown in FIG. 5 and FIG. 6, the mechanical lower arm portion comprises a D1-axis portion (4), an E-axis portion (5) and a D2-axis portion (6).

The D1-axis portion (4) comprises a fourth servo motor (401), a fourth speed reducer (403) and a fourth speed reducer mounting base (402). The fourth servo motor (401) is directly connected to the fourth speed reducer (403). The fourth speed reducer (403) is fixedly connected to the fourth speed reducer mounting base (402) and also connected to the third sliding seat (307) of the Z2-axis portion (3). The fourth speed reducer (403) is mounted on the third sliding seat (307) of the Z2-axis portion (3). The fourth servo motor (401) drives the fourth speed reducer (403) to rotate. When an output shaft of the fourth speed reducer (403) is secured, the fourth speed reducer (403) drives the fourth speed reducer mounting base (402) to rotate, such that the whole D1-axis portion (4) swings and a reciprocating swinging function of the lower arm is achieved. As the fourth speed reducer mounting base (402) is made of aluminium alloy, on the premise of meeting the requirement for strength, the weight of the front-section moving part of the robot and the driving power are reduced. The running energy consumption is reduced.

The E-axis portion (5) comprises a driving mechanism. The driving mechanism comprises a fifth servo motor (501) and a fifth speed reducer (502) which are mounted in the fourth speed reducer mounting base (402). The fifth servo motor (501) is directly connected to the fifth speed reducer (502). An output end of the fifth speed reducer (502) is fixedly connected to one end of an inner sleeve (504). The fourth speed reducer mounting base (402) is fixedly connected to an outer sleeve (503). The outer sleeve (503) and the inner sleeve (504) are connected through a bearing (505). The fifth speed reducer (502) of the E-axis portion (5) is mounted in the fourth speed reducer mounting base (402) of the D1-axis portion (4) and conducts a rotational motion relative to the D1-axis portion (4). The fifth servo motor (501) for driving is covered in the fourth speed reducer mounting base (402), such that the size of the front section is reduced, and interference caused when the front section of the robot enters a press (9) is avoided. Owing to the rotating function of the E-axis portion (5), a sheet may be conveyed between the presses in a direction inclined to a logistics direction. The outer sleeve (503) is secured to the fourth speed reducer mounting base (402) of the D1-axis portion (4) is a matched manner. The inner sleeve (504) is connected to an output shaft of the fifth speed reducer (502) and conducts a rotational motion. As the bearing (505) is added between the inner sleeve and the outer sleeve, the stress bearing capacity of the front section of the lower arm is increased, guaranteeing the load of the high-speed stamping transfer robot (11).

The D2-axis portion (6) comprises a D2-axis fixed seat (601) fixedly connected to the other end of the inner sleeve (504). A sixth speed reducer (603) is disposed on one side of the D2-axis fixed seat (601) and directly connected to a sixth servo motor (602). An output shaft of the sixth speed reducer (603) is connected to a fourth transmission shaft through a coupler. A third driving pulley (604) is disposed on the fourth transmission shaft. A third driven pulley (605) is disposed on the D2-axis fixed seat (601). The third driving pulley (604) and the third driven pulley (605) are mounted in the D2-axis fixed seat (601). A fourth synchronous belt (606) is mounted on the third driving pulley (604) and the third driven pulley (605). Connecting flange plates (610) connected to the tooling portion (7) are disposed at two ends of the third driven pulley (604). A tensioning device is further disposed in the D2-axis fixed seat (601) and comprises a swing rod (607), a tensioning wheel (608) and an ejector rod (609). One end of the swing rod (607) is hinged to the inner wall of the D2-axis fixed seat (601). The tensioning wheel (608) is disposed at the other end of the swing rod (607). One end of the ejector rod (609) is fixedly connected to the inner wall of the D2-axis fixed seat (601), and the other end thereof is propped in a concave hole in the middle of the swing rod (607). The ejector rod (609) is in threaded connection with an adjusting nut. The tensioning wheel (608) is clung to the fourth synchronous belt (606).

The sixth speed reducer (603) is mounted on the D2-axis fixed seat (601). The sixth servo motor (602) drives the third driving pulley (604). The third driven pulley (605) is driven by the fourth synchronous belt (606). The tensioning wheel (608) in the middle is configured for tensioning and mounted at one end of the swing rod (607). The other end of the swing rod (607) is fixedly connected to the D2-axis fixed seat (601) by means of hinging. The distance of the ejector rod (609) is adjusted to tension the fourth synchronous belt (606). The operation is performed from the outer side. The adjustment is facilitated. Here, the fourth synchronous belt (606) is adopted for transmission. On the premise of guaranteeing accurate transmission, a contact impact between a sucker (704) and the sheet during material taking by the tooling portion (7) at the tail end may be resisted. Thus, damages caused by direct resistance of the sixth speed reducer (603) are avoided. Here, owing to the rotating function of the D2-axis portion (6), the sheet may be kept horizontal in a conveying process. Further, air resistance is reduced. The sheet is prevented from interfering with ambient objects. The connecting flange plate (610) mounted at the third driven pulley (605) may be replaced according to a connection mode of the tooling portion (7) at the tail end, thus facilitating connection of the tooling portion (7) at the tail end.

The fourth speed reducer (403) and the fourth speed reducer mounting base (402) are an RV speed reducer and an RV speed reducer mounting base. The RV speed reducer has the characteristics of small size and light weight. Thus, the overall dimension and weight of the D1-axis portion (4) are reduced.

Figure 7:
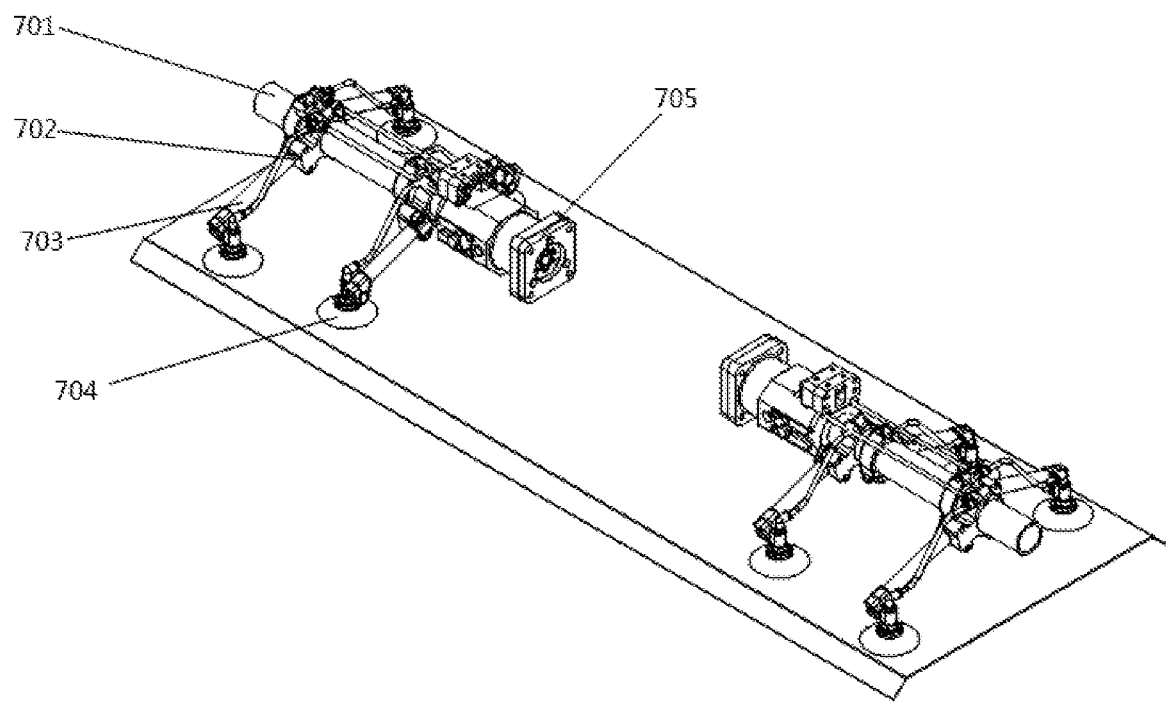
FIG. 7 is a structural schematic view of a tooling portion provided by the present invention.

As shown in FIG. 7, the tooling portion (7) comprises two toolings each of which comprises a main rod (701) and an auxiliary rod (703). Two connecting pieces (702) sleeve the main rod (701) and are connected to the two auxiliary rods (703) that are symmetrical. The auxiliary rod (703) is perpendicular to the main rod (701). A sucker (704) is disposed at the other end of the auxiliary rod (703). A connecting flange (705) connected to the connecting flange plate (610) is disposed at one end of the main rod (701) and configured to mount the tooling, and may be replaced with a quick-change device to facilitate automatic replacement of the tooling. The auxiliary rod (703) is mounted on the main rod (701) through the connecting piece (702). Arrangement of the auxiliary rod (703) is adjusted according to the shape and the weight of the sheet. The sucker (704) is mounted on the auxiliary rod (703) and configured to suck the sheet. In addition, for transfer of the two sheets machined by one mold and with different center distances, cylinders or servo motors are mounted at two ends of the tooling for driving.

Figure 8:
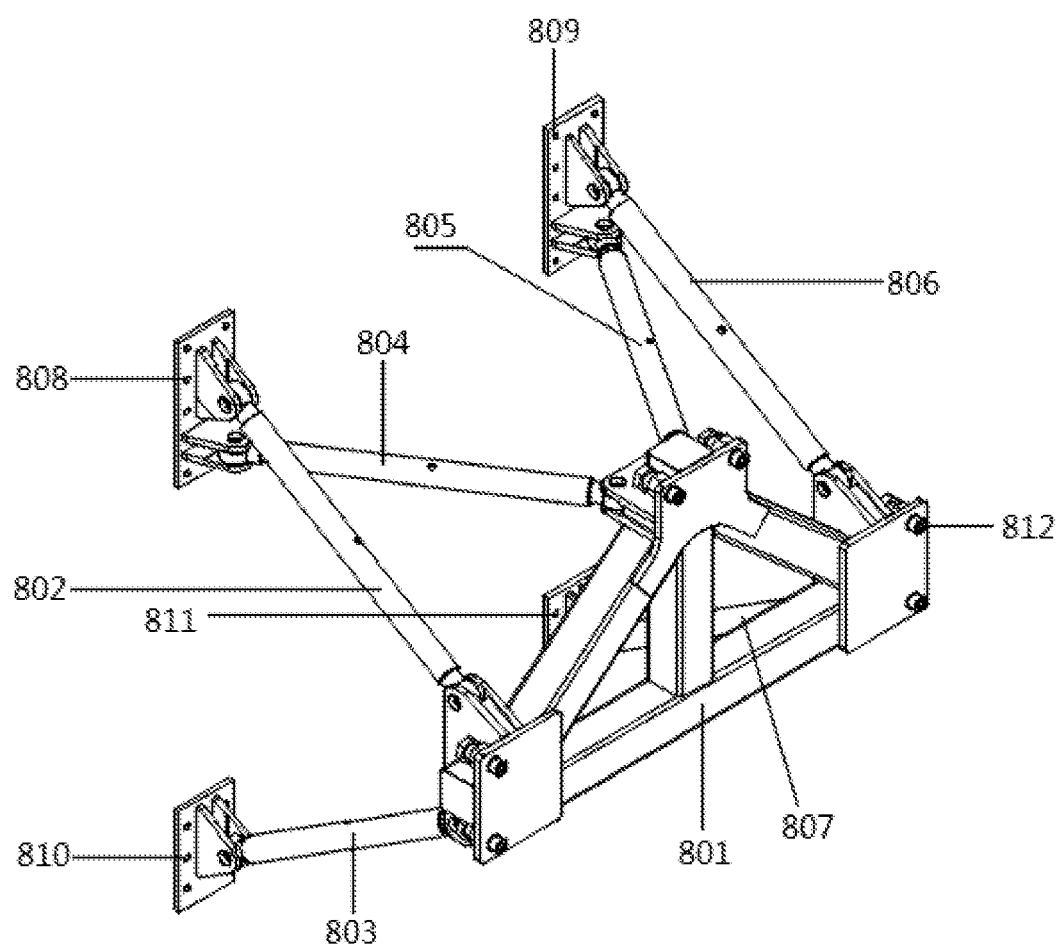
FIG. 8 is a structural schematic view of a suspension portion provided by the present invention.
Figure 9:
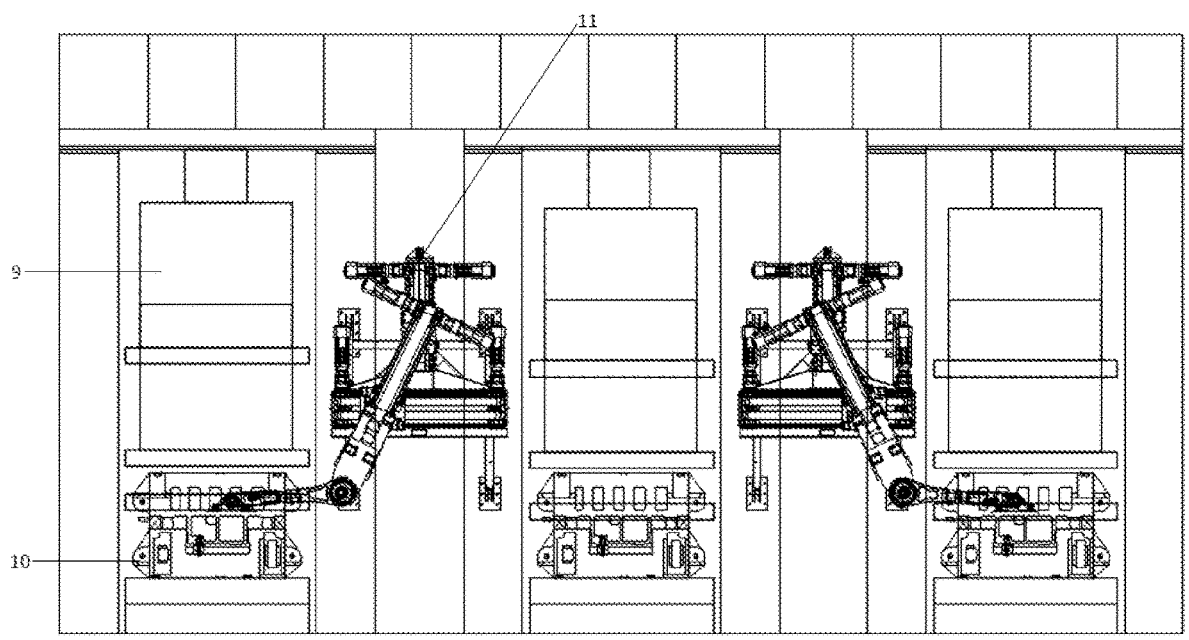
FIG. 9 is a schematic view of a transfer system on an automatic stamping line provided by the present invention.

As shown in FIG. 8, the transfer robot further comprises a suspension portion (8). The suspension portion (8) comprises a connecting base (801), a first connecting rod (802), a second connecting rod (803), a third connecting rod (804), a fourth connecting rod (805), a fifth connecting rod (806), a sixth connecting rod (807), a first lug (808), a second lug (809), a third lug (810) and a fourth lug (811). The connecting base (801) is triangular. Lug joints are disposed at two ends of the first connecting rod (802), the second connecting rod (803), the third connecting rod (804), the fourth connecting rod (805), the fifth connecting rod (806) and the sixth connecting rod (807) respectively and adopt right-and-left threaded structures. The lug joints at one ends of the first connecting rod (802) and the second connecting rod (803) are hinged to one end portion at the bottom of the connecting base (801). The lug joints at the other ends of the first connecting rod (802) and the second connecting rod (803) are hinged to the first lug (808) and the third lug (810) respectively. The lug joints at one ends of the fifth connecting rod (806) and the sixth connecting rod (807) are hinged to the other end portion at the bottom of the connecting base (801). The lug joints at the other ends of the fifth connecting rod (806) and the sixth connecting rod (807) are hinged to the second lug (809) and the fourth lug (811) respectively. The lug joints at one ends of the third connecting rod (804) and the fourth connecting rod (805) are hinged to the top of the connecting base (801). The lug joints at the other ends of the third connecting rod (804) and the fourth connecting rod (805) are hinged to the first lug (808) and the second lug (809) respectively. A plurality of connecting sleeves (812) with external threads is disposed on the connecting base (801). Internal threads matched with external threads are formed on the connecting base (801). A connecting sleeve (812) passes through a lock nut to be in threaded connection with the connecting base (801). A screw passes through a through hole in the connecting sleeve (812). The connecting base (801) and the Y-axis base (101) are fixedly connected through the screw inside the connecting sleeve (812).

According to the high-speed stamping transfer robot 11, the Z2-axis portion (3) (upper arm) is driven to swing by the Y-axis portion (1) and the Z1-axis portion (2). The lower arm portion moves linearly and rotationally on the Z2-axis portion (3) (upper arm). Through linkage among the respective axis portions, high-speed and high-load stable transfer of the sheet between the presses is realized.

Although the present invention has been described in detail with reference to the foregoing embodiments, those skilled in the art may still modify the technical solutions described in the foregoing embodiments, or equivalently replace part of the technical features. Any modifications, equivalent substitutions, improvements, etc. within the spirit and the principle of the present invention should fall within the scope of protection of the present invention.

The invention claimed is:

1. A high-speed stamping transfer robot, comprising:
a Y-axis portion, a Z1-axis portion, a Z2-axis portion, a mechanical lower arm portion and a tooling portion, wherein the Z1-axis portion is fixedly connected to the Y-axis portion; the Z2-axis portion is in rotational connection with the Z1-axis portion and the Y-axis portion and is capable of moving vertically relative to the Z1-axis portion while moving horizontally relative to the Y-axis portion; the mechanical lower arm portion is in rotational connection with the Z2-axis portion and is capable of rotating relative to the Z2-axis portion; and the tooling portion is fixedly connected to the mechanical lower arm portion, and further comprising:
a suspension portion, wherein the suspension portion comprises a connecting base, a first connecting rod, a second connecting rod, a third connecting rod, a fourth connecting rod, a fifth connecting rod, a sixth connecting rod, a first lug, a second lug, a third lug and a fourth lug; one end of the first connecting rod and one end of the second connecting rod are hinged to one end portion at the bottom of the connecting base, and the other end of the first connecting rod and the other end of the second connecting rod are hinged to the first lug and the third lug respectively; one end of the fifth connecting rod and one end of the sixth connecting rod are hinged to the other end portion at the bottom of the connecting base, and the other end of the fifth connecting rod and the other end of the sixth connecting rod are hinged to the second lug and the fourth lug respectively; one end of the third connecting rod and one end of the fourth connecting rod are hinged to the top of the connecting base, and the other end of the third connecting rod and the other end of the fourth connecting rod are hinged to the first lug and the second lug respectively; and the connecting base is fixedly connected to the Y-axis portion.

2. The high-speed stamping transfer robot according to claim 1, wherein the Y-axis portion comprises:
a first transmission shaft; synchronous pulleys disposed on the first transmission shaft and mounted on two sides of the interior of a Y-axis base; a first synchronous belt mounted on the synchronous pulley; a first sliding disposed on the first synchronous belt and connected to a first rotary seat through a bearing; first linear guide rails that are symmetrical and are disposed on two sides of the first synchronous belt; a first slider that corresponds to the first linear guide rail is disposed on the first sliding seat; the first sliding seat is capable of moving horizontally along the first linear guide rail which is equipped with a guide rail brake; and a first limiting block is disposed on the outer side of the first transmission shaft.

3. The high-speed stamping transfer robot according to claim 2, wherein the two synchronous pulleys are disposed on the first transmission shaft; the first synchronous belt is mounted on each of the two synchronous pulleys that are symmetrical; and bearing supports are mounted at the two ends and in the middle of the first transmission shaft.

4. The high-speed stamping transfer robot according to claim 1, wherein the Z1-axis portion comprises:
a Z1-axis base; the bottom of the Z1-axis base is fixedly mounted on the Y-axis base; a first driving pulley is disposed at the top of the interior of the Z1-axis base; a first driven pulley is disposed at the bottom of the interior of the Z1-axis base; a second synchronous belt is mounted on the first driving pulley and the first driven pulley; a second sliding seat is disposed on the second synchronous belt and connected to a second rotary seat through a bearing; second linear guide rails are disposed on two sides of the second synchronous belt; a second slider that corresponds to the second linear guide rail is disposed on the second sliding seat; and the second sliding seat is capable of moving vertically along the second linear guide rail which is equipped with a guide rail brake.

5. The high-speed stamping transfer robot according to claim 4, wherein the Z1-axis portion further comprises:
a speed-up pulley block and a balance cylinder; the speed-up pulley block is mounted on a base of the speed-up pulley block, which is located at the upper end of the Z1-axis base; a steel wire rope is connected to the second sliding seat and wound in a fixed pulley groove of the speed-up pulley block, and enlaces a movable pulley on the balance cylinder; and the other end of the steel wire rope is connected to the base of the speed-up pulley block.

6. The high-speed stamping transfer robot according to claim 1, wherein the Z2-axis portion comprises:
a Z2-axis base; a second driving pulley is disposed at the top of the interior of the Z2-axis base; a second driven pulley is disposed at the bottom of the interior of the Z2-axis base; a third synchronous belt with a third sliding seat disposed thereon is mounted on the second driving pulley and the second driven pulley; third linear guide rails are disposed on the front side and the back side of the Z2-axis base and located on two sides of the third synchronous belt; the third sliding seat is mounted on and is capable of moving linearly along the third linear guide rail on the front side of the Z2-axis base; the third linear guide rail on the back side of the Z2-axis base is connected to the Y-axis portion in a sliding manner; and the back side of the Z2-axis base is connected to the second rotary seat.

7. The high-speed stamping transfer robot according to claim 1, wherein the mechanical lower arm portion comprises a D1-axis portion, an E-axis portion and a D2-axis portion;
the D1-axis portion is in rotational connection with the Z2-axis portion;
the E-axis portion comprises a driving mechanism, an inner sleeve and an outer sleeve, the outer sleeve and the inner sleeve are connected through a bearing, an output end of the driving mechanism is fixedly connected to one end of the inner sleeve, and the D1-axis portion is fixedly connected to the outer sleeve; and the D2-axis portion comprises a D2-axis fixed seat fixedly connected to the other end of the inner sleeve, a third driving pulley is disposed in the D2-axis fixed seat, a third driven pulley is disposed in the D2-axis fixed seat, a fourth synchronous belt is mounted on the third driving pulley and the third driving pulley, and connecting flange plates connected to the tooling portion are disposed at two ends of the third driven pulley.

8. The high-speed stamping transfer robot according to claim 7, wherein a tensioning device is further disposed in the D2-axis fixed seat and comprises a swing rod, a tensioning wheel and an ejector rod, one end of the swing rod is hinged to the inner wall of the D2-axis fixed seat, the tensioning wheel is disposed at the other end of the swing rod, one end of the ejector rod is fixedly connected to the inner wall of the D2-axis fixed seat, the other end of the ejector rod is propped in a concave hole in the middle of the swing rod, the ejector rod is in threaded connection with an adjusting nut, and the tensioning wheel is clung to the fourth synchronous belt.

9. The high-speed stamping transfer robot according to claim 1, wherein the tooling portion comprises two toolings each of which comprises a main rod and an auxiliary rod, a plurality of connecting pieces sleeves the main rod and is connected to the two auxiliary rods that are symmetrical, the auxiliary rod is perpendicular to the main rod, a sucker is disposed at the other end of the auxiliary rod, and a connecting flange connected to the mechanical lower arm portion is disposed at one end of the main rod.

\* \* \* \* \*